(12) United States Patent
Stroeters et al.

(10) Patent No.: US 10,137,807 B2
(45) Date of Patent: Nov. 27, 2018

(54) VENTILATED VEHICLE SEAT WITH BLIND COUPLING AND RELATED METHOD

(71) Applicants: Kurt H Stroeters, Clawson, MI (US); Mihai Morariu, Warren, MI (US)

(72) Inventors: Kurt H Stroeters, Clawson, MI (US); Mihai Morariu, Warren, MI (US)

(73) Assignee: FCA US LLC, Auburn Hills, MI (US)

( * ) Notice: Subject to any disclaimer, the term of this patent is extended or adjusted under 35 U.S.C. 154(b) by 320 days.

(21) Appl. No.: 15/088,172

(22) Filed: Apr. 1, 2016

(65) Prior Publication Data

US 2017/0282765 A1    Oct. 5, 2017

(51) Int. Cl.
*B60N 2/56* (2006.01)

(52) U.S. Cl.
CPC ........... *B60N 2/5657* (2013.01); *B60N 2/565* (2013.01); *B60N 2/5642* (2013.01)

(58) Field of Classification Search
CPC ..... B60N 2/5657; B60N 2/5642; B60N 2/565
USPC ....................................... 297/180.14; 29/91.1
See application file for complete search history.

(56) References Cited

U.S. PATENT DOCUMENTS

| | | | |
|---|---|---|---|
| 6,929,322 B2 * | 8/2005 | Aoki ................. | B60H 1/00285 297/180.13 |
| 7,114,771 B2 | 10/2006 | Lofy et al. | |
| 7,607,739 B2 * | 10/2009 | Browne ............... | B60N 2/5621 297/180.1 |
| 8,979,620 B2 | 3/2015 | Efthymiou et al. | |
| 9,738,191 B2 * | 8/2017 | Langensiepen ...... | B60N 2/5678 |
| 2004/0160093 A1 | 8/2004 | Stoewe | |
| 2004/0164594 A1 | 8/2004 | Stoewe et al. | |
| 2010/0102599 A1 * | 4/2010 | Itou ......................... | B29C 33/10 297/180.14 |
| 2010/0327636 A1 | 12/2010 | Stoll et al. | |
| 2013/0300179 A1 | 11/2013 | Ota | |

FOREIGN PATENT DOCUMENTS

| | | |
|---|---|---|
| DE | 10059358 A1 | 6/2002 |
| DE | 102006054860 | 5/2008 |
| DE | 102009033254 | 1/2011 |
| EP | 1675747 | 7/2006 |

OTHER PUBLICATIONS

International Search Report and Written Opinion dated Jul. 4, 2017 for International Applicaton No. PCT/US2017/024550, International Filing Date Mar. 28, 2017.

\* cited by examiner

*Primary Examiner* — Milton Nelson, Jr.
(74) *Attorney, Agent, or Firm* — Ralph E. Smith (57) ABSTRACT

A manifold is coupled to a foam core with a primary manifold opening with a blind coupling fixedly positioned adjacent the B-side of the foam core. Front and rear hook members extend from a coupling frame of the blind coupling. Front and rear lips are positioned on opposite sides of a blower opening with a domed framework. The front hook members are positioned relative to the coupling frame to hook the front lip to provide fore and aft positioning of the blind coupling relative to the blower opening. The front hook members are designed to slide laterally along the front lip and to cause the coupling frame to engage the domed framework to provide lateral positioning of the blind coupling relative to the blower opening.

10 Claims, 9 Drawing Sheets

VENTILATED VEHICLE SEAT WITH BLIND COUPLING AND RELATED METHOD

FIELD

The present disclosure relates to ventilated automobile vehicle seats with blind ventilation passage couplings and related methods.

BACKGROUND

For many years automotive manufacturers have been concerned with designing seats for vehicles that provide added comfort to seated occupants. This has led to various typed of ventilated seats exist, including heated, air conditioned, and ventilated seats. In many cases, integrating the necessary components into a vehicle seat in a way that is easy to manufacture and assemble is not easy.

For example, when it is desired to provide a vehicle seat that pushes or pulls air through an air permeable seat cover, an air distribution system is necessary to provide airflow between the upwardly-facing A-side of the seat cushion, which is covered by the seat cover, and a space below the opposite, downwardly-facing B-side of the seat cushion.

This air distribution system additionally needs to be coupled to an inlet/outlet of a blower or other mechanism to provide positive or negative air pressure through the air distribution system. Typically, the inlet/outlet of such a blower or other mechanism to which the air distribution system needs to be coupled is fixedly or immovably coupled to a portion of a supporting base or frame of the seat. Visual and physical access to the location of the inlet/outlet the blower or other mechanism is, in some cases, at least partially blocked as the foam seat cushion with the air distribution system is coupled to the frame. Thus, it is desirable to provide a blind coupling mechanism and process to couple the inlet/outlet of an air distribution system fixed to the B-side of the seat cushion to the inlet/outlet of the blower or other mechanism fixed to the seat frame or base.

SUMMARY

In accordance with one aspect of the present disclosure a ventilated automobile vehicle seat includes a seat cushion sub-assembly and a seat base sub-assembly. The seat cushion sub-assembly includes a foam core having an A-side and a B-side opposite the A-side and a manifold providing fluid communication between a plurality of distributed manifold inlet/outlet openings and a primary manifold inlet/outlet opening. The manifold is coupled to the foam core with the primary manifold inlet/outlet opening fixedly positioned adjacent the B-side of the foam core. In addition, a blind coupling has a coupling frame surrounding and reinforcing the primary manifold inlet/outlet opening, and a pair of front hook members and a pair of rear hook members extending from opposite sides of the coupling frame and away from the B-side of the foam core. The seat base sub-assembly includes a blower unit coupled to a seat base member. The seat base sub-assembly has a front lip and a rear lip positioned on opposite sides of a blower inlet/outlet opening, and has a domed framework extending across the blower inlet/outlet opening. When the seat cushion sub-assembly is rotated with the B-side facing toward the seat base sub-assembly during an assembly operation, the front hook members are positioned relative to the coupling frame to hook the front lip to provide fore and aft positioning of the blind coupling relative to the blower inlet/outlet opening. When the front hook members are hooked to the front lip and the seat cushion sub-assembly is rotated during the assembly operation, the pair of front hook members and front lip are designed to permit the front hook members to slide laterally along the front lip and are positioned relative to the coupling frame to cause the coupling frame to engage the domed framework to provide lateral positioning of the blind coupling relative to the blower inlet/outlet opening. The pair of rear hook members extends from the coupling frame to hook the rear lip.

In another aspect of the present disclosure a method of assembling a ventilated automobile vehicle seat includes coupling a blind coupling member, including a coupling frame defining a coupling inlet/outlet, and a pair of front hook members and a pair of rear hook members extending from opposite sides of the coupling frame, to a B-side of a foam core with the front and rear hook members extending away from the B-side of the foam core. After coupling the blind coupling member to the B-side, the foam core is rotated with the B-side facing toward a combined blower unit and seat base sub-assembly to hook the front hook members on a front lip of the seat base sub-assembly to align the blind coupling member fore and aft relative to a blower inlet/outlet. After rotating the foam core to hook the front hook members on the front lip, the foam core is rotated with the B-side facing toward the seat base sub-assembly to engage the coupling frame with a domed framework extending from the blower inlet/outlet to align the blind coupling member laterally relative to a blower inlet/outlet. After rotating the foam core to hook the front hook members on the front lip, the foam core is rotated with the B-side facing toward the seat base sub-assembly to engage the coupling frame with a domed framework extending from the blower inlet/outlet to align the blind coupling member laterally relative to a blower inlet/outlet. After rotating the foam core to engage the coupling frame with the domed framework, a force is applied to an A-side of the foam core opposite the B-side to hook the rear hook members on a rear lip of the seat base sub-assembly to complete the coupling of the blind coupling member to the seat base subassembly.

In an aspect, the seat cushion sub-assembly includes a seat cover extending over the A-side of the foam core. The seat cover is coupled to the seat base sub-assembly at a position which guides the front hook to a position that engages the front lip when the seat cushion sub-assembly is rotated toward the seat base sub-assembly during the assembly operation.

In an aspect, the front lip comprises an outwardly curved shape, and in an aspect, a downwardly facing front terminal edge of a front wall of the blower unit and the rear lip comprises a downwardly facing rear terminal edge of a rear wall of the blower unit.

In an aspect, hooking the front hook members on the front lip includes engaging and longitudinally sliding an arm portion of the front hook members against the front lip.

DRAWINGS

The present invention will become more fully understood from the detailed description and the accompanying drawings.

DETAILED DESCRIPTION

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

Figure 1:
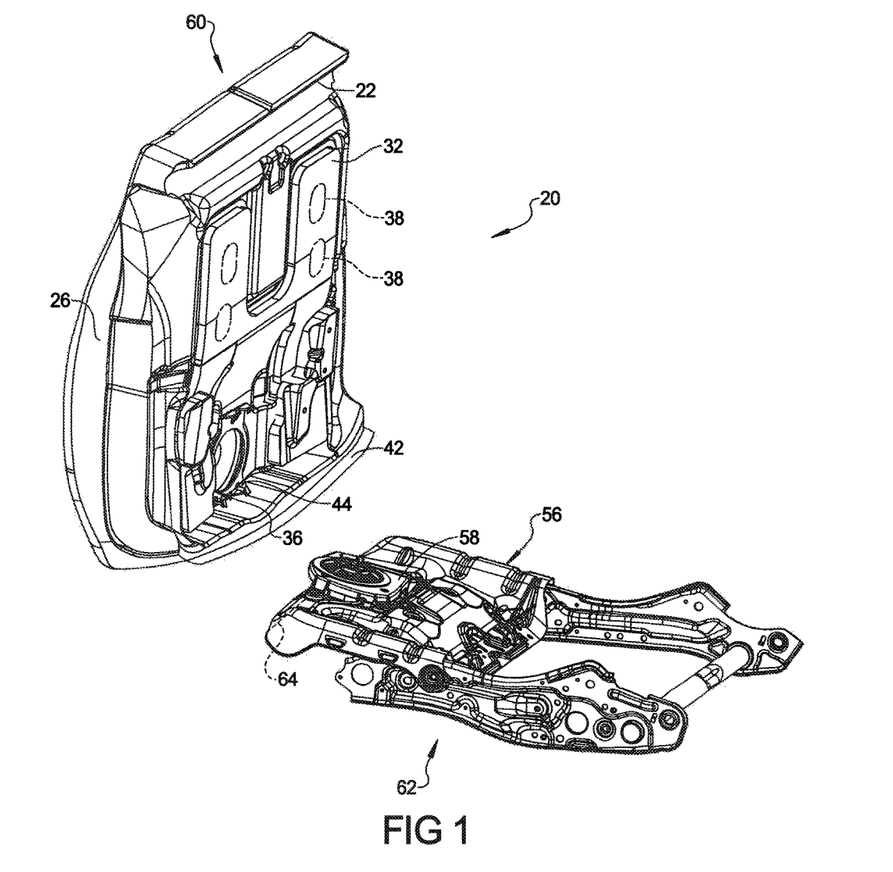
FIG. 1 is a partially exploded perspective view of one example of a ventilated vehicle seat with a blind coupling in accordance with the present disclosure.
Figure 2:
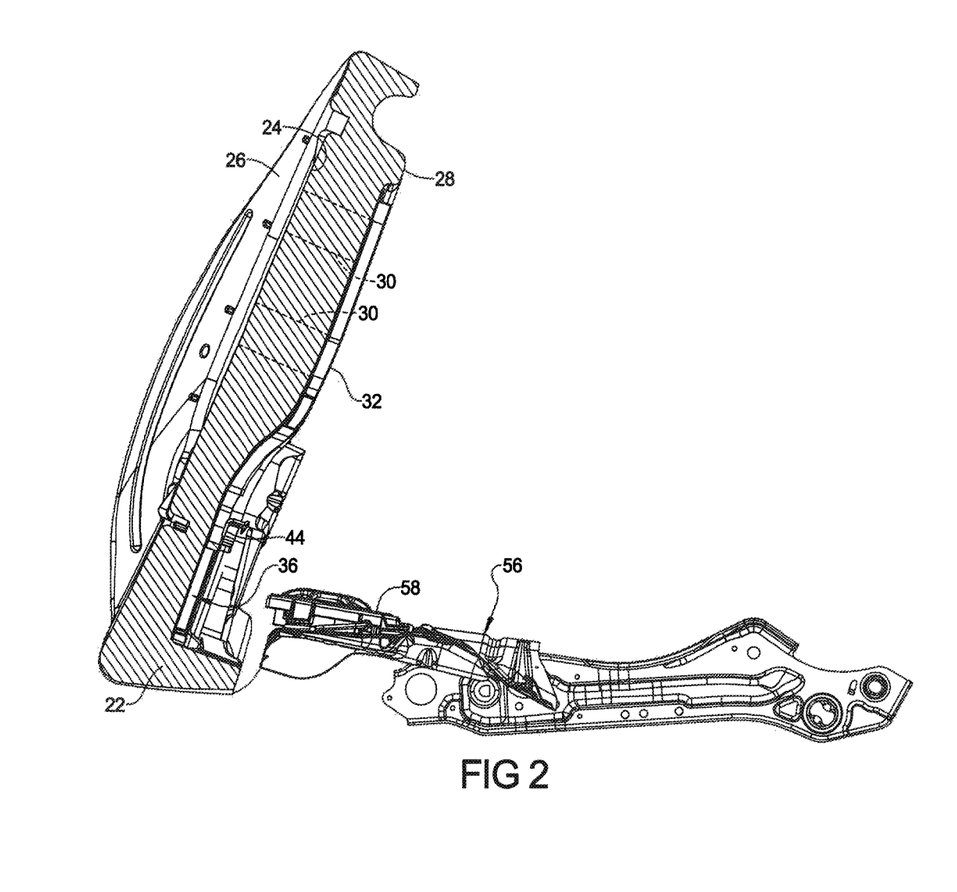
FIG. 2 is a partially cross-sectioned side elevation view of the example seat with blind coupling of FIG. 1.

A ventilated vehicle seat 20 includes a foam core or cushion 22 with an upwardly-facing A-side 24 of the foam core 22, which is covered by a seat cover 26 that is air-permeable. A downwardly-facing B-side 28 is opposite the A-side 24 of the foam core 22. A plurality of air passages 30 extends through the foam core 22 between the A-side 24 and the B-side 28. The seat cover includes a clip 42, such as an elongated J-clip channel with locking protrusions 88.

An air manifold 32 is coupled along, or laminate to, a portion of the B-side 28 of the foam core 22 via adhesive or other suitable means. The air manifold 32 generally includes upper and lower sheet members 40 joined at their periphery, and spaced from each other by an internal support structure 86 extending therebetween. The air manifold 32 provides fluid communication via an internal air passageway 34 between a primary inlet/outlet opening 36 and a plurality of distributed inlet/outlet openings 38. The distributed inlet/outlet openings 38 are aligned with the air passages 30 extend through the foam core 22 providing fluid communication between the primary inlet/outlet opening 36 of the manifold 32 and the A-side 24 of the foam core 22.

A blind coupling 44 surrounds and reinforces the primary inlet/outlet opening 36 of the manifold 32. For example, the blind coupling 44 includes an annular coupling frame 46 that is coupled or laminated to the sheet member 40 around a periphery of the primary inlet/outlet opening 36 of the manifold 32. A pair of front hook members 48 and a pair of rear hook members 50 extend from opposite sides of the coupling frame 46 and away from the coupling frame 46 and away from the foam core 22. In the illustrated embodiment, each of the front and back hook members 48, and 50, respectively, includes an extending arm member 52 and a coupling hooks 54.

A seat base member 56 provides support to the foam cushion 22 when the ventilated seat 20 is assembled together. The seat base member 56 is part of an overall seat base assembly that typically includes several components or members which provide the structural seat support and coupling components required to attach the ventilated seat 20 to a floor of the vehicle. A blower unit 58 is fixedly coupled to the seat base member 56 that generally supports and moves with the foam core 22, when assembled together. In an aspect, the blower unit 58 includes a blower 90 and a blower bracket 92.

Figure 7:
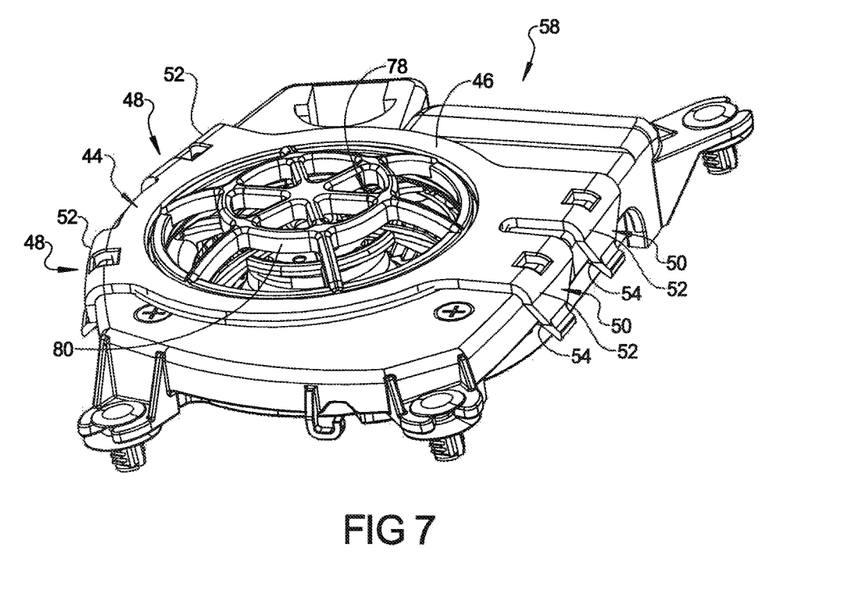
FIG. 7 is a top perspective view of the blower unit and blind coupling of FIG. 1 assembled together with the other components removed for clarity.
Figure 8:
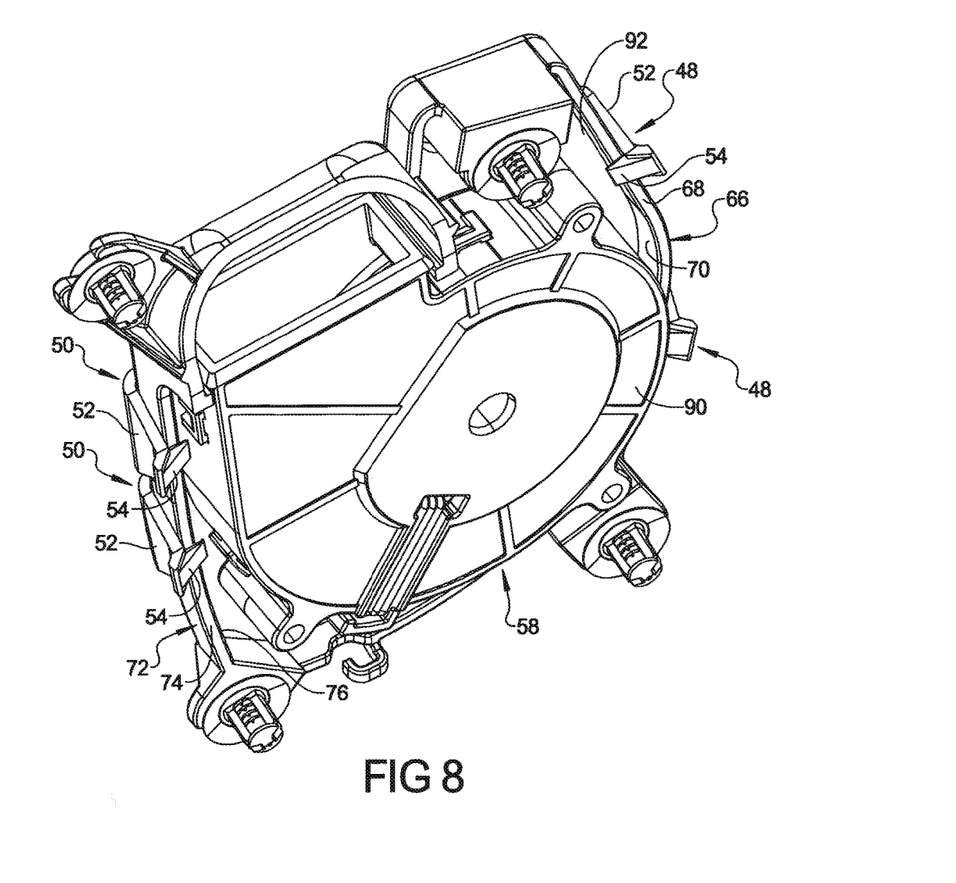
FIG. 8 is a bottom perspective view of the blower unit and blind coupling of FIG. 1 assembled together.
Figure 9:
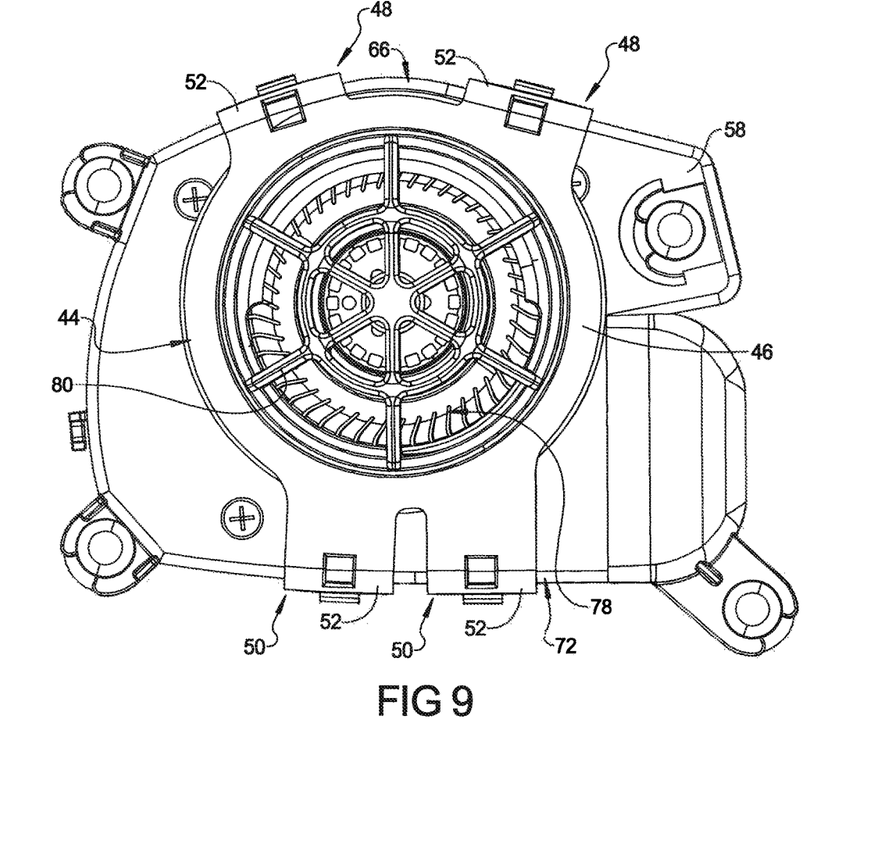
FIG. 9 is a top plan view of the blower unit and blind coupling of FIG. 1 assembled together.

The blower unit 58 has an inlet/outlet opening 78 and a domed framework structure 80 of blower bracket 92 extending upwardly above and across the inlet/outlet opening 78. In an aspect, the outer diameter of the domed framework 80 of the blower unit 58 corresponds substantially to the inner diameter of the annular coupling frame 46 of blind coupling 44.

The blower unit 58 additionally includes a front lip 66, which in the illustrated example, includes a downwardly facing front terminal edge 68 of a front wall 70 of the blower bracket 92 of the blower unit 58. In an aspect, the front lip 66 has a curved shape 66. Similarly, the blower unit 58 includes a rear lip 72 including a downwardly facing rear terminal edge 74 of a rear wall 76 of the blower bracket 92 of the blower unit 58. The lips 66, 72 and the hook members 48, 50 are designed to cooperatingly engage each other to fixedly couple the blind coupling 44 to the blower unit 58.

Assembly of the illustrated embodiment includes assembling the foam core 22, the seat cover 26 and the manifold 32, with the blind coupling 44, together into a seat cushion sub-assembly 60. The manifold 32 is adhered to the B-side 28 of the foam core 22 adjacent the blind coupling 44. Thus, the blind coupling 44 is coupled to the B-side 28 via the manifold 32 to retain the annular coupling frame 46 in a position extending substantially parallel to the adjacent B-side surface 28 of the foam core 22. Separately, the blower unit 58 and seat base member 56 are fixedly coupled together into a seat base sub-assembly 62.

Figure 3:
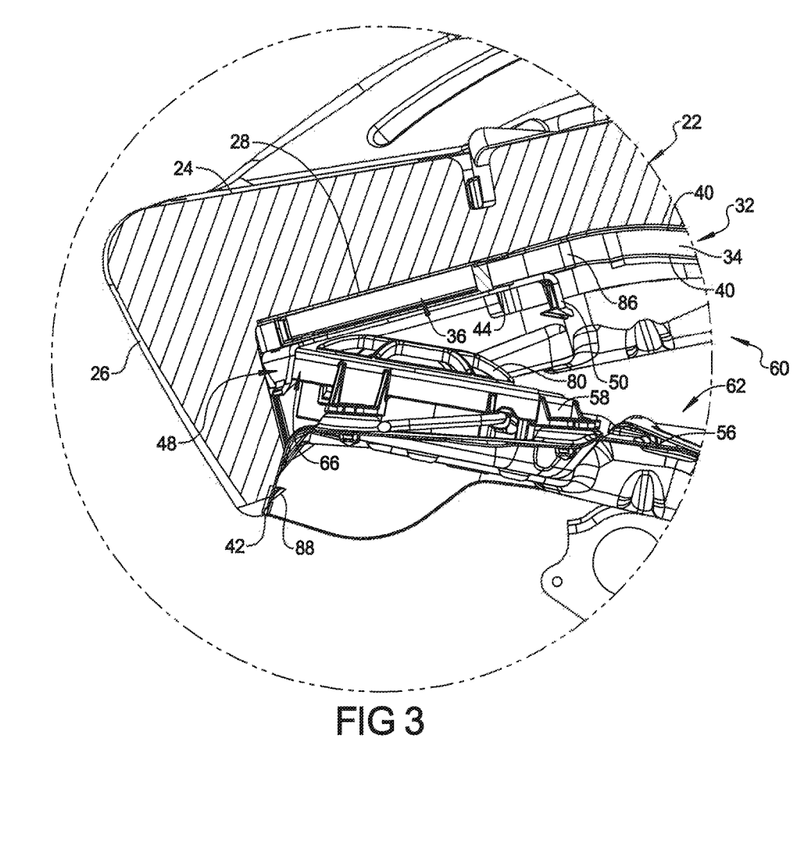
FIG. 3 is an enlarged side elevation view of the example seat with blind coupling of FIG. 1 in an assembly position.

In an aspect, the clip 42 of the seat cover 26 of the seat cushion sub-assembly 60 is coupled to a downwardly extending flange 64 of the seat base subassembly 62. For example, the downwardly extending flange 64 is received in an elongated J-clip channel of the clip 42 and retained therein via the locking protrusions 88 engaging corresponding locking apertures in the flange 64. This provides an initial coupling between the seat cushion sub-assembly 60 and the seat base subassembly 62. This coupling enables the seat cover 26 to provide some an initial relative positioning restriction of the two assemblies 60, 62 relative to each other.

The resulting restriction in relative positioning causes the front hook members 48 to engage against the front coupling lip 66 of the blower unit 58 as the seat cushion sub-assembly 60 is rotated into an assembled position with the B-side 28 facing toward and supported by the seat base sub-assembly 62. In an aspect, the front lip 66 of the blower unit 58 engages against and slides longitudinally along the arms 52 of the front hook members 48 until the hooks 54 engage and hook against the terminal edge 74 as the cushion sub assembly 60 is rotated from a generally perpendicular relative position (FIG. 2) toward a generally parallel relative position (FIG. 4).

Figure 4:
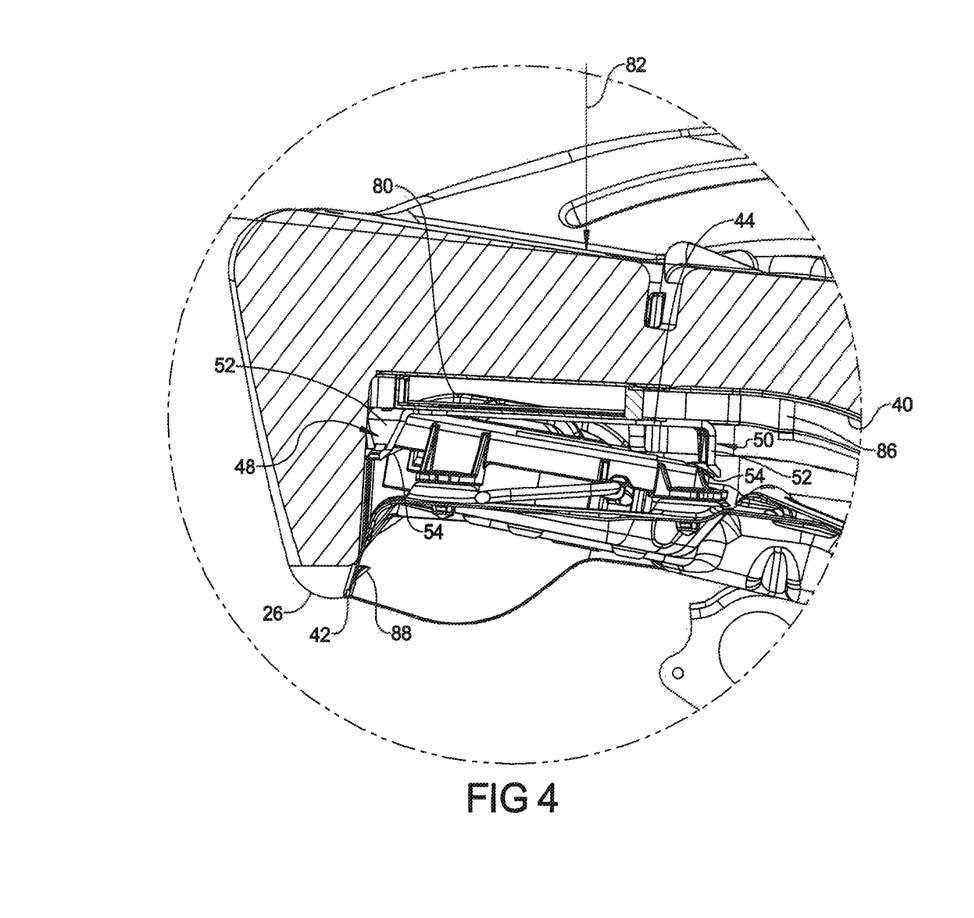
FIG. 4 is an enlarged side elevation view similar to FIG. 3, but in another assembly position.
Figure 5:
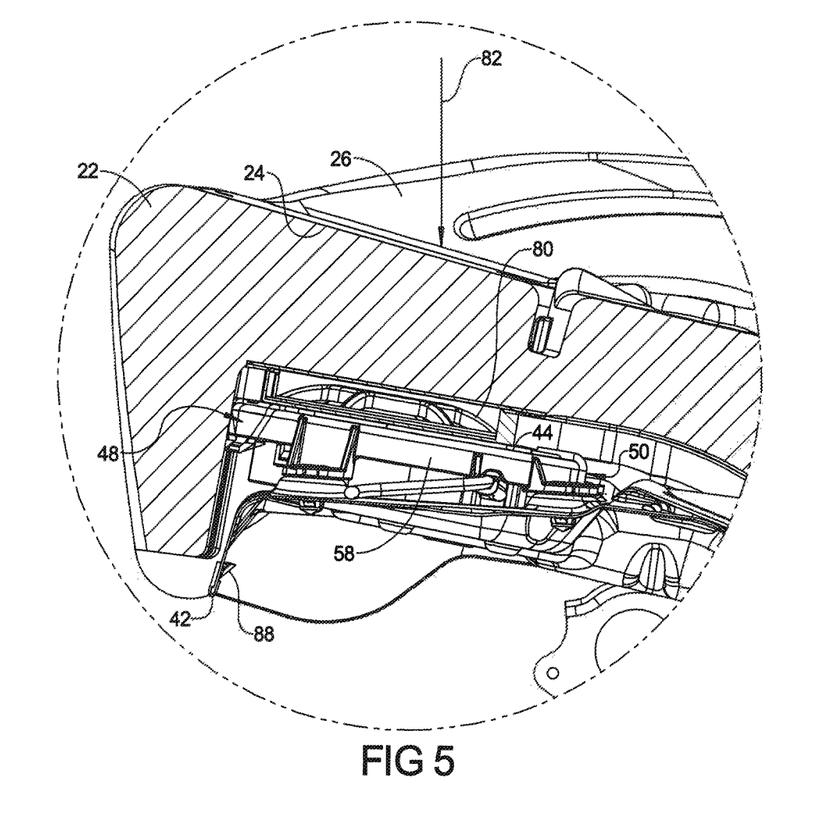
FIG. 5 is an enlarged side elevation view similar to FIGS. 3 and 4, but in a fully coupled assembly position.
Figure 6:
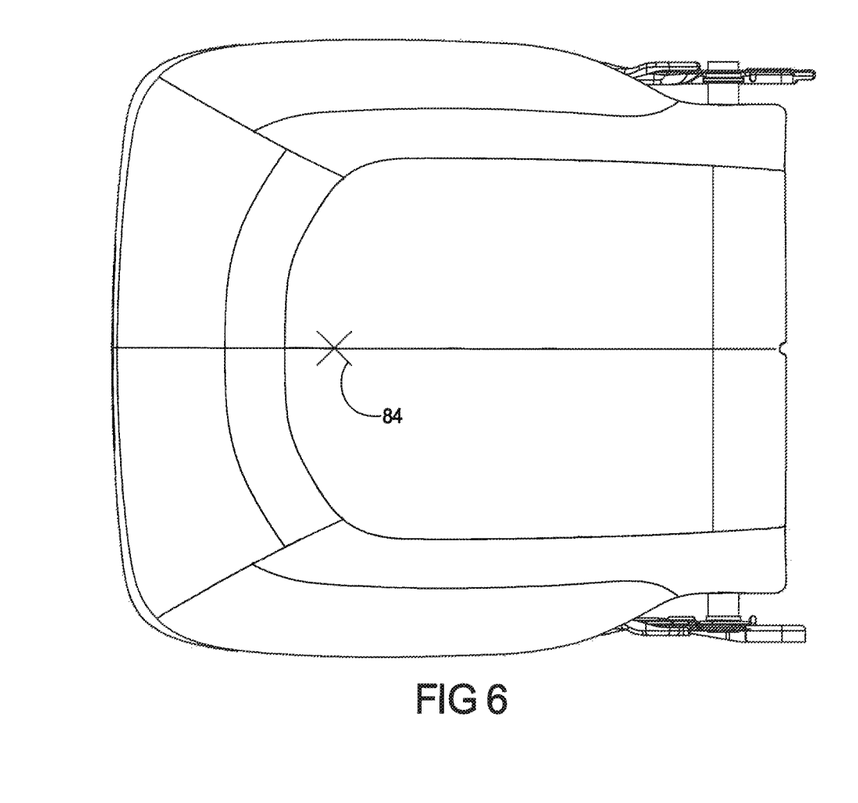
FIG. 6 is a top plan view of the example seat of FIG. 1.

As shown in FIG. 4, simply rotating the cushion sub-assembly 60 into the generally parallel position relative to the seat base sub-assembly 62 may not always guarantee that the rear hook members 50 will engage and couple with the rear lip 72. Referring to FIGS. 4-6, in an aspect, a downward force 82 is applied to the A-side 24 of the foam core 22 at a location 84 directly above the blind coupling 44 and blower unit 58 to insure that the rear hook members 50 properly engage and couple with the rear lip 72. The downward force 82 is applied directly to the outer surface of the seat cover 26, thereby indirectly applying the downward force 82 to the A-side 24 of the foam core 22.

As should be apparent from the above, the engagement of the front hook members 48 against the front lip 66, and subsequently of the rear hook members 50 against the rear lip 72, during the assembly operation insures proper fore and aft positioning of the blind coupling 44 relative to the blower unit 58. In addition, as the cushion sub-assembly 60 is rotated relative to the seat base sub-assembly 62 during the assembly operation, the upwardly extending dome framework structure 80 of blower bracket 92 of the blower unit 58 engages the annular frame 46 to insure proper lateral positioning of the blind coupling 44 relative to the blower unit 58.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A ventilated automobile vehicle seat comprising:
    a seat cushion sub-assembly including:
        a foam core having an A-side and a B-side opposite the A-side;
        a manifold providing fluid communication between a plurality of distributed manifold inlet/outlet openings and a primary manifold inlet/outlet opening, the manifold being coupled to the foam core with the primary manifold inlet/outlet opening fixedly positioned adjacent the B-side of the foam core; and
        a blind coupling having a coupling frame surrounding and reinforcing the primary manifold inlet/outlet opening and a pair of front hook members and a pair of rear hook members extending from opposite sides of the coupling frame and away from the B-side of the foam core; and
    a seat base sub-assembly including:
        a blower unit coupled to a seat base member, the seat base sub-assembly having a front lip and a rear lip positioned on opposite sides of a blower inlet/outlet opening, and having a domed framework extending across the blower inlet/outlet opening;
    wherein the front hook members are positioned relative to the coupling frame to hook the front lip to provide fore and aft positioning of the blind coupling relative to the blower inlet/outlet opening when the seat cushion sub-assembly is rotated with the B-side facing toward the seat base sub-assembly during an assembly operation; and
    wherein the pair of front hook members and front lip are designed to permit the front hook members to slide laterally along the front lip and are positioned relative to the coupling frame to cause the coupling frame to engage the domed framework to provide lateral positioning of the blind coupling relative to the blower inlet/outlet opening when the front hook members are hooked to the front lip and the seat cushion sub-assembly is rotated during the assembly operation; and
    wherein the pair of rear hook members extend from the coupling frame and hook the rear lip.

2. The ventilated automobile vehicle seat of claim 1, wherein the seat cushion sub-assembly further comprises a seat cover extending over the A-side of the foam core, the seat cover being coupled to the seat base sub-assembly at a position which guides the front hook members to a position that engages the front lip when the seat cushion sub-assembly is rotated toward the seat base sub-assembly during the assembly operation.

3. The ventilated automobile vehicle seat of claim 1, wherein the front lip comprises an outwardly curved shape.

4. The ventilated automobile vehicle seat of claim 1, wherein the front lip comprises a downwardly facing front terminal edge of a front wall of the blower unit and the rear lip comprises a downwardly facing rear terminal edge of a rear wall of the blower unit.

5. The ventilated automobile vehicle seat of claim 1, wherein the foam core has a plurality of passages providing fluid communication through the foam core between the A-side and the B-side, and the manifold is coupled to the B-side of the foam core to provide fluid communication between the primary manifold inlet/outlet opening and a B-side of the plurality of passages via the plurality of distributed manifold inlet/outlet openings.

6. A method of assembling a ventilated automobile vehicle seat comprising:
    coupling a blind coupling member, including a coupling frame defining a coupling inlet/outlet and a pair of front hook members and a pair of rear hook members extending from opposite sides of the coupling frame, to move with a B-side of a foam core with the front and rear hook members extending away from the B-side of the foam core;
    after coupling the blind coupling member to the B-side, rotating the foam core with the B-side facing toward a combined blower unit and seat base sub-assembly to hook the front hook members on a front lip of the seat base sub-assembly to align the blind coupling member fore and aft relative to a blower inlet/outlet;
    after rotating the foam core to hook the front hook members on the front lip, rotating the foam core with the B-side facing toward the seat base sub-assembly to engage the coupling frame with a domed framework extending from the blower inlet/outlet to align the blind coupling member laterally relative to a blower inlet/outlet;
    after rotating the foam core to engage the coupling frame with the domed framework, applying a force to an A-side of the foam core opposite the B-side to hook the rear hook members on a rear lip of the seat base sub-assembly to complete the coupling of the blind coupling member to the seat base subassembly.

7. The method of assembling a ventilated automobile vehicle seat of claim 6, further comprising positioning a seat cover over the A-side of the foam core, and coupling an edge of the seat cover to the seat base sub-assembly prior to rotating the foam core to hook the front hook members on a front lip of the seat base sub-assembly.

8. The method of assembling a ventilated automobile vehicle seat of claim 6, wherein hooking the front members on the front lip comprises hooking the front hook members on an outwardly curved shape of the front lip.

9. The method of assembling a ventilated automobile vehicle seat of claim 6, wherein hooking the front hook members on the front lip comprises engaging and longitudinally sliding an arm portion of the front hook members against the front lip.

10. The method of assembling a ventilated automobile vehicle seat of claim 6, wherein hooking the front hook members on the front lip comprise hooking the front hook members on a downwardly facing front terminal edge of a front wall of the blower unit forming the front lip, and wherein hooking the rear hook members on the rear lip comprises hooking the rear hook members on a downwardly facing rear terminal edge of a rear wall of the blower unit forming the front lip.

\* \* \* \* \*